T. L. GUNNING.
VEHICLE TIRE.
APPLICATION FILED AUG. 8, 1912.
1,060,080.
Patented Apr. 29, 1913.
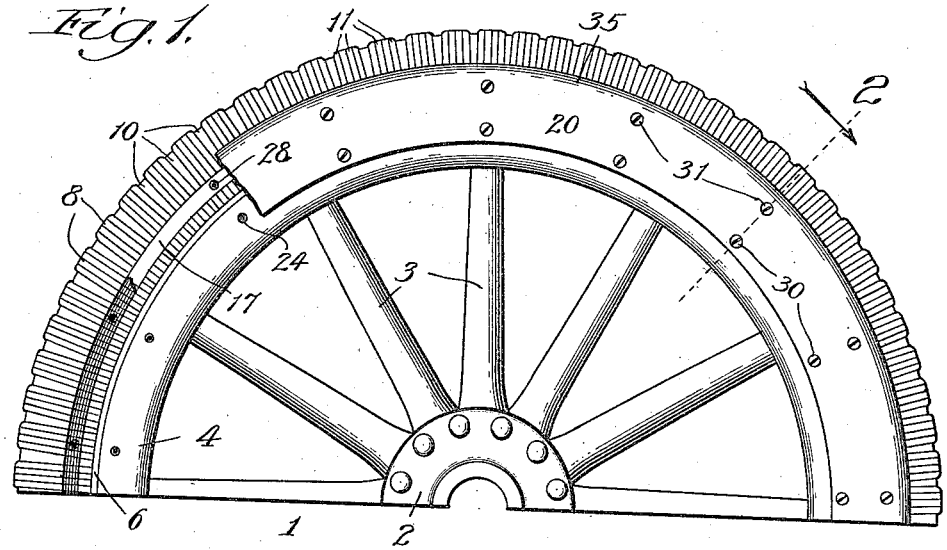
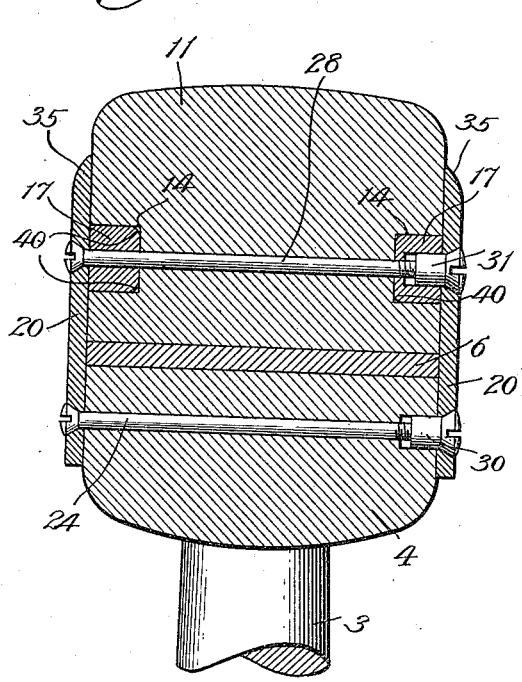
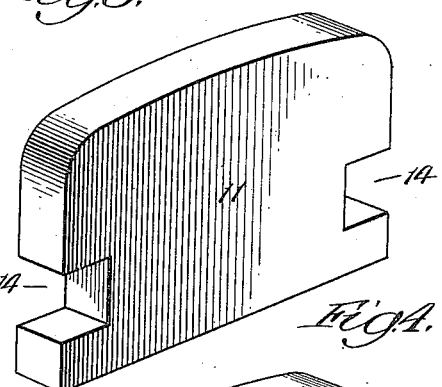
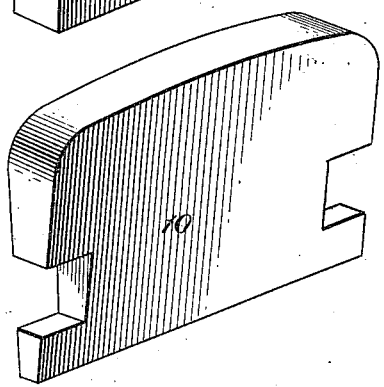
Witnesses:
Inventor:
Thomas L. Gunning,
By Hirschl & Hirschl
Attys
COLUMBIA PLANOGRAPH CO., WASHINGTON, D. C.

UNITED STATES PATENT OFFICE.

THOMAS L. GUNNING, OF CHICAGO, ILLINOIS.

VEHICLE-TIRE.

1,060,080.

Specification of Letters Patent.

Patented Apr. 29, 1913.

Application filed August 8, 1912. Serial No. 713,966.

*To all whom it may concern:*

Be it known that I, THOMAS L. GUNNING, a citizen of the United States, residing at Chicago, Cook county, Illinois, (whose post-office address is 2803 Indiana avenue,) have invented new and useful Improvements in Vehicle-Tires, of which the following is a specification.

This invention relates to vehicle tires, including those designed more especially for the wheels of heavy motor vehicles, such as motor trucks, where it is necessary to provide a certain degree of resiliency together with great strength and durability, and where the form of the tire and its material must be designed to afford the necessary tractive effort to prevent side-slip and skidding; and in addition to propel the vehicle, if the tire is used on the driving wheels. As is well known pneumatic and solid rubber tires have been largely used for such purpose, and, as is well known also, the great initial expense and the high cost of up-keep of all forms of rubber tire, and of nearly all tires heretofore designed as substitutes or improvements on the rubber tire, have arrested the development and prevented the general employment of motor trucks more than any other factor in their design.

One of the objects of the present invention is to provide a tire which shall possess the necessary qualities above stated, including great durability, and which also may be constructed at a great saving in cost over any motor truck tire which has heretofore been in practical use, being so designed that the parts of the tire which are subject to the greatest wear and tear may be made of a tough wear-resisting material which is cheap, and readily obtained in the market.

A form of tire embodying the principles of the present invention is illustrated in the accompanying drawings in which:

Figure 1 is a view in side elevation showing part of a vehicle wheel equipped with my improved tire. Fig. 2 is a transverse section on the line 2 of Fig. 1. Fig. 3 is a view in enlarged perspective of a portion of one of the resilient packing sections comprising part of the tire. Fig. 4 is a similar view of one of the metal wedge plates which are interposed between adjacent sections of packing material.

As shown in said drawings 1 indicates a vehicle wheel of ordinary form, comprising a hub 2, spokes 3, and felly 4. This felly is made with a flat tread surface and is encircled by a flat steel or iron felly band 6, which is shrunk in place in the same manner as the steel tire is ordinarily shrunk upon a vehicle wheel. Distributed around the circumference of the wheel and resting upon the felly band 6 are the parts forming the tread portion of the tire, the same comprising sections of yielding and resilient material 8, distributed uniformly around the circumference of the wheel and separated by interposed wedge-plates 10. Each of the resilient sections 8 is preferably composed of several pieces of material, here shown as four in number, and one of such pieces, 11, is illustrated in Fig. 3, being shown as generally rectangular in outline but with its outer edge and outer corners rounded off to form a tread surface generally convex in cross section, as seen in Fig. 2. In each radial edge of the piece 11, and near its bottom is also cut a rectangular notch 14; and when the pieces 11 are assembled in groups of four and distributed around the circumference of the wheel, the notches 14 form annular grooves which are engaged by rings 17, of generally rectangular cross section, to retain the sections upon the felly band. Owing to other features of construction of the tire it is not necessary to taper the pieces 11 in thickness in order to conform the resilient sections 8 to the curvature of the wheel, and each piece may be made of uniform thickness throughout; the pieces 11 being preferably formed by cutting up lengths of worn and discarded rubber belting into pieces of the shape shown in Fig. 3.

Between each two adjacent resilient sections 8 is interposed one of the relatively harder wedge-plates 10, which may be of metal, and the latter are made to coincide in outline with the pieces 11; except that they are slightly shorter and thereby allow the resilient sections to extend beyond their outer edges to take the greater part of the wear, and also to form a notched tread surface for the purpose of affording better traction. The wedge plates are also tapered in thickness the required amount to make them fit between the untapered sections 8 and in constructing the tire the alternate resilient sections and wedge-plates are packed tightly together and the last few wedge-plates are forced into place under pressure in order to form a hard and tough tread surface which will support the weight carried by the wheel.

When the alternate yielding and resilient sections 8 and wedge-plates 10 are arranged in place upon the felly band 6, the annular grooves formed by the notches in their sides are engaged by the rectangular rings 17, and over the latter are bolted wide flat rings, or side plates 20, which are made of sufficient width to extend inward over the felly 4; and also outward over and beyond the rings 17, to engage the sides of the tread parts 8 and 10 and support them beyond the points where they are of smallest width because of the notches in their sides (see Fig. 2). The plates 20 are secured in place by a row of bolts 24 which pass through the felly 4, and by a second row of bolts 28, which pass through the rings 17 beneath them and through some of the resilient section 8. In order to avoid projecting parts, the bolts 24 and 28 are made with flat heads countersunk into one of the side plates 20, and are engaged by threaded nipples, 30 and 31 respectively, which are similarly provided with flat heads countersunk into the other side plate. The side plates 20 are also made with their outer edges beveled and rounded, as shown at 35 and the edges of the rings 17 which enter the notches 14 are also rounded, as shown at 40, to facilitate assembling the parts, as they are made to fit tightly into their grooves.

The parts are assembled by distributing the alternate resilient sections 8 and wedge-plates 10 around the felly band 6 and packing them tightly together, forcing some of the wedge-plates into place under pressure; then forcing the rings 17 into their annular grooves and lastly bolting the side plates 20 over the sides of the felly and tire.

I claim as my invention:

The combination with a vehicle wheel having a felly, of a tire therefor composed of groups of tread sections, each section being provided on its opposite sides with notches, said sections being arranged transversely of the felly and extending circumferentially thereof, wedge blocks interposed between the groups and having notches on their opposite sides, a pair of rings adapted to fit into the notches on the opposite sides of the tread sections, a pair of side rings adapted to extend over the sides of the tread sections and the sides of the felly, bolts passing through the side rings, the notch-engaging ring and the tread sections for securing said parts together, and means for securing the side rings to the felly.

In witness whereof, I have hereunto subscribed my name in the presence of two witnesses the 2nd day of August 1912.

THOMAS L. GUNNING.

Witnesses:
A. S. UTITZ,
R. P. MULVANEY.

---

Copies of this patent may be obtained for five cents each, by addressing the "Commissioner of Patents, Washington, D. C."